(12) United States Patent
Michimura et al.

(10) Patent No.: US 10,805,487 B2
(45) Date of Patent: Oct. 13, 2020

(54) IMAGE FORMING APPARATUS WITH A TOUCHPANEL, IMAGE FORMING METHOD, AND NON-TRANSITORY COMPUTER READABLE MEDIUM

(71) Applicant: FUJI XEROX CO., LTD., Tokyo (JP)

(72) Inventors: Tadao Michimura, Kanagawa (JP); Masao Morita, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/443,572

(22) Filed: Feb. 27, 2017

(65) Prior Publication Data

US 2018/0091669 A1    Mar. 29, 2018

(30) Foreign Application Priority Data

Sep. 26, 2016 (JP) .................................. 2016-187291

(51) Int. Cl.
*H04N 1/00* (2006.01)

(52) U.S. Cl.
CPC ..... *H04N 1/00506* (2013.01); *H04N 1/00411* (2013.01); *H04N 1/00472* (2013.01); *H04N 1/00477* (2013.01); *H04N 1/00915* (2013.01); *H04N 2201/0094* (2013.01); *H04N 2201/0098* (2013.01)

(58) Field of Classification Search
None
See application file for complete search history.

(56) References Cited

U.S. PATENT DOCUMENTS

| | | | | |
|---|---|---|---|---|
| 2004/0196471 | A1* | 10/2004 | Hirai | H04N 1/0035 358/1.1 |
| 2005/0002065 | A1* | 1/2005 | Kotaka | H04N 1/0035 358/400 |
| 2006/0024105 | A1* | 2/2006 | King | B41J 13/0063 400/76 |
| 2006/0232800 | A1* | 10/2006 | Otake | H04N 1/40062 358/1.9 |
| 2007/0188791 | A1* | 8/2007 | Utsunomiya | H04N 1/00411 358/1.13 |
| 2008/0119167 | A1* | 5/2008 | Rao | G06Q 30/02 455/411 |
| 2009/0059286 | A1* | 3/2009 | Yamaguchi | H04N 1/00472 358/1.15 |
| 2012/0050783 | A1* | 3/2012 | Osuki | G06F 3/1204 358/1.14 |

(Continued)

FOREIGN PATENT DOCUMENTS

| | | |
|---|---|---|
| JP | H11-3004 A | 1/1999 |
| JP | 2004-320717 A | 11/2004 |

(Continued)

OTHER PUBLICATIONS

Jun. 9, 2020 Office Action issued in Japanese Patent Application No. 2016-187291.

*Primary Examiner* — Mohammad H Ghayour
*Assistant Examiner* — Pawan Dhingra
(74) *Attorney, Agent, or Firm* — Oliff PLC

(57) ABSTRACT

An image forming apparatus includes a touchpanel, and a controller that pops up a screen, on the touchpanel automatically without an operation instruction from a user, information that identifies a job ready for execution and a button that is adapted to stop the execution of the job.

21 Claims, 6 Drawing Sheets

(56) References Cited

U.S. PATENT DOCUMENTS

| | | | | |
|---|---|---|---|---|
| 2012/0105909 A1* | 5/2012 | Kano | ................ | H04N 1/00244 358/1.15 |
| 2012/0166214 A1* | 6/2012 | Benagi | ............... | G06Q 10/0633 705/2 |
| 2013/0222847 A1* | 8/2013 | Okuma | ................ | G06K 15/002 358/1.15 |

FOREIGN PATENT DOCUMENTS

| | | | |
|---|---|---|---|
| JP | 2004-320718 | A | 11/2004 |
| JP | 2008-022546 | A | 1/2008 |
| JP | 2009-039938 | A | 2/2009 |
| JP | 2015-099420 | A | 5/2015 |

* cited by examiner

IMAGE FORMING APPARATUS WITH A TOUCHPANEL, IMAGE FORMING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2016-187291 filed Sep. 26, 2016.

BACKGROUND (i) Technical Field

The present invention relates to an image forming apparatus, an image forming method, and a non-transitory computer readable medium.

(ii) Related Art

Multi-function apparatuses, having a copying function, a printer function, and a facsimile function, are going to have even more functions, and are desirably constructed such that an entire system thereof including a variety of applications is efficient.

A fax job may now be performed. In order to slop scanning during the fax job, a stopping process is performed on a confirm screen by pressing a stop button.

The stopping process of the job after scanning is typically performed as below. A job list screen is called by pressing a job confirm button, a job to be stopped is selected, and a stop button is pressed on a detailed screen. The step operation is performed on the confirm screen.

FIG. 6A through FIG. 6E illustrate a process to stop a fax job.

FIG. 6A illustrates a screen to start the fax job. An execute button is pressed to start the fax job. A document to be faxed is thus scanned and digitized.

FIG. 6B illustrates a screen to stop the fax job for some reason after scanning. The user presses a job confirm button arranged in a predetermined location on the screen.

FIG. 6C illustrates a job list screen that appears when the job confirms button is pressed. The fax job that is in progress is listed on the job list screen. The fax job that is in progress is listed at the bottom as illustrated in FIG. 6C.

FIG. 6D illustrates a screen in which the fax job that is in progress is selected on the job list screen. A detailed screen of the fax job in progress is displayed. As illustrated in FIG. 6D, a job owner and start time are displayed together with the job in progress.

FIG. 6E illustrates a screen that appears when the stop button is pressed on the detailed screen. The message reading "Do you stop job?" is displayed on a confirm screen. The user may stop the fax job after scanning by pressing a stop button on the confirm screen.

In related art technique, to stop the fax job after scanning, the following steps are taken.

First step: Press the job confirm button.
Second step: Select the job to be stopped on the job list screen.
Third step: Press the stop button on the detailed screen.
Fourth step: Press the stop button on the confirm screen.
The above process is relatively complex, and a more efficient process is desirable.

In the field of multi-function apparatuses, the operation screen is typically a touchpanel. Hardware keys, such as the stop button and the job confirm button, today tend to be deleted. A technique of efficiently stopping a job in progress in an environment free from the hardware keys is desired.

SUMMARY

According to an aspect of the invention, there is provided an image forming apparatus. The image forming apparatus includes a touchpanel, and a controller that pops up a screen, on the touchpanel automatically without an operation instruction from a user, information that identifies a job ready for execution and a button that is adapted to stop the execution of the job.

BRIEF DESCRIPTION OF THE DRAWINGS

Exemplary embodiments of the present invention will be described in detail based on the following figures, wherein.

DETAILED DESCRIPTION

Exemplary embodiments of the present invention are described with reference to the drawings.

Figure 1:
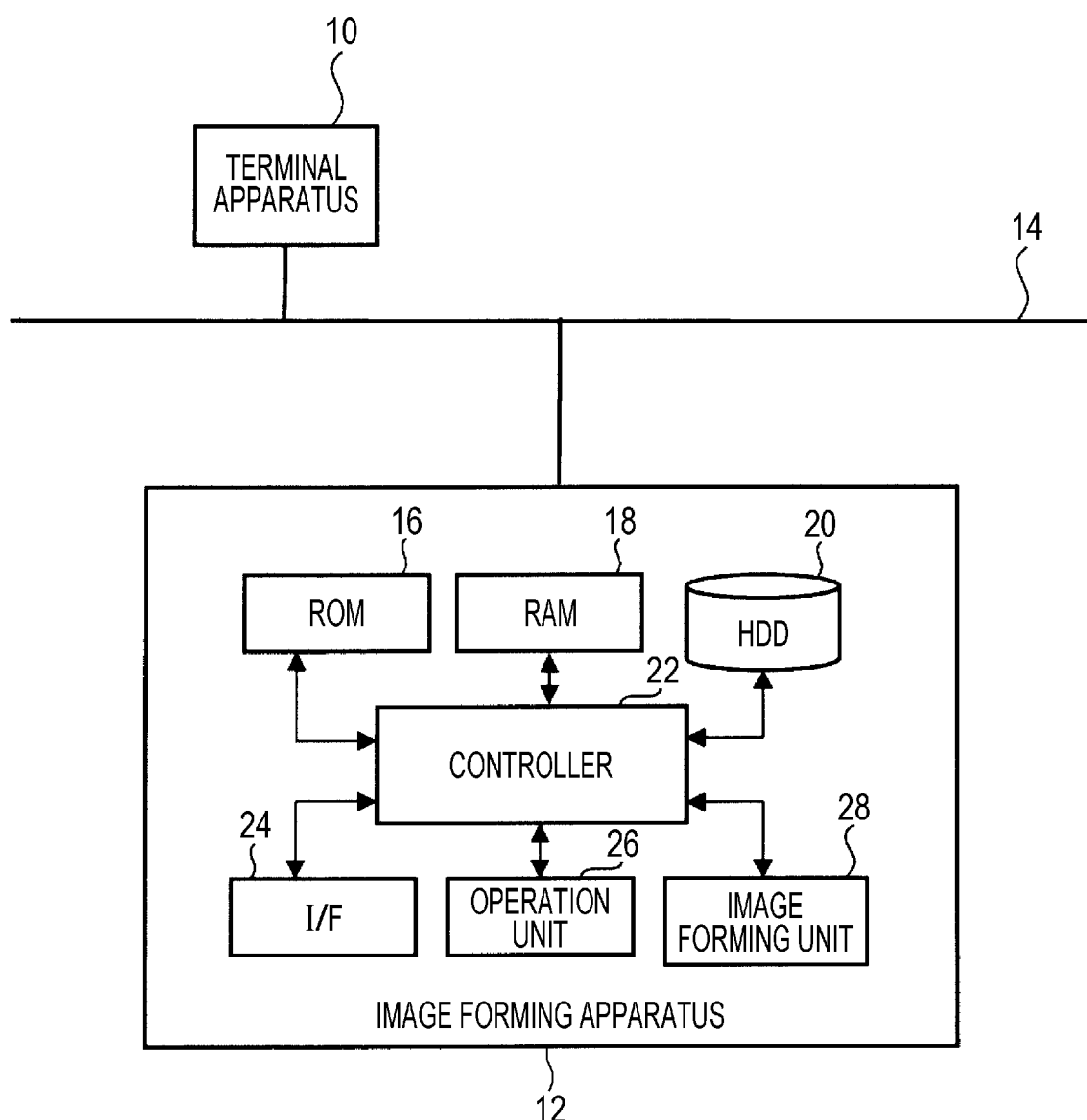
FIG. 1 is a functional block diagram of an image forming apparatus.

FIG. 1 is a functional block diagram of an image forming system including an image forming apparatus 12 of an exemplary embodiment. The image forming system includes a terminal apparatus 10 and the image forming apparatus 12. The terminal apparatus 10 and the image forming apparatus 12 are connected to each other via a communication network 14. The communication network 14 is a data communication network, such as a local area network (LAN).

The terminal apparatus 10 is connected to the image forming apparatus 12 via the communication network 14, and transmits a print job including a print command to print a document in response to an instruction from a user.

The image forming apparatus 12 includes a read-only memory (ROM) 16, a random-access memory 18, a hard disk drive (HDD) 20, a controller 22 including one or more central processing units (CPUs), an input and output interface (I/F) 24, an operation unit 26, such as a touchpanel, and an image forming unit 28.

In response to a processing program stored on the ROM 16, the controller 22 including one or more CPUs receives a print job command from the terminal apparatus 10 via the input and output I/F 24, generates intermediate data by interpreting page description language (PDL) data, and generates raster data from the generated intermediate data. The controller 22 executes a variety of commands for copy, scan, and fax, received from the operation unit 26. The controller 22 monitors a progress state of a job received from a user, and displays the progress state on the operation unit 26 as appropriate. The job progress states include a job started, a job in progress, and a job completed. The controller 22 automatically displays, particularly, the job in progress on the operation unit 26 as described below.

The image forming unit 28 includes a printer module, a scanner module, a fax module, a paper feeder module, an original documenter feeder module, and an image processing accelerator.

The printer module has a function of outputting an image onto a paper sheet. For example, the printer module includes an ink-jet system of related art, and prints raster data onto the paper sheet. The printer module ejects a liquid or a fusible solid ink to record the raster data onto a paper sheet, film, or the like. The method of ejecting ink may be the drop-on-demand system (pressure pulse system) that ejects ink using electrostatic attraction, or the thermal ink jet system that ejects ink using a pressure that is generated by forming and growing bubbles using heat. Recording heads include a head that ejects cyan ink, a head that ejects magenta ink, a head that ejects yellow ink, and a head that ejects black ink. Each head is a line head that has a width at least as equal as the width of paper sheets. The recording heads eject ink drops therefrom to an intermediate transfer body for recording, and the ink is then transferred to the paper sheet for printing.

The scanner module reads an image from a paper sheet, and converts the image into digital data.

The fax module includes a modem connected to a telephone line and a fax image processing unit, and executes the facsimile function.

The paper sheet feeder module transports the paper sheet from a paper tray to the printer module.

The original document feeder module transports an original document from an original document tray to the scanner module.

The image processing accelerator performs compression/decompression in cooperation with the scanner module. The image processing accelerator does not necessarily have to be included and may be treated as an additional module.

The image forming apparatus 12 may further include a finisher that performs punching and sorting on paper sheets, an authenticating unit that includes a universal serial bus (USB), and an IC card reader, a billing unit, a human sensor, and a camera photographing human faces.

The image forming apparatus 12 may be connected to the Internet via the communication network 14, and may include Ethernet (registered trademark), and Wi-Fi (registered trademark).

In accordance with the processing program, the controller 22 displays icons (buttons) of a variety of applications on the operation unit 26, receives an operation instruction from the user, and performs the instruction. For example, if a fax button is displayed on the operation unit 26 and the user touches (presses) the fax button, a predetermined fax job is performed. Specifically, the predetermined fax job includes transporting to the fax module an original document set on an original tray during fax transmission, scanning the original document to convert the original document to image data, performing desired image processing, and transmitting the resulting image data to a specified transmission destination using a modem. During fax reception, a variety of operations is performed, including receiving the fax data, printing the fax data onto a paper sheet using the printer module, and discharging the printed paper sheet. The transmission job during the fax transmission and the printing job during the fax reception may be set to be in a standby state (queuing state). The controller 22 may keep a given original document ready for a transmission job while performing image data conversion by scanning another original document, or may keep a print job of given received fax data ready while receiving different fax data.

Even if the user has started the job, he or she may want to stop the job in the middle for some reason. For example, after an original document is scanned and converted into image data for fax transmission in the fax job, the user may want to stop the fax transmission later. If a scanner and a printer operate alone or in cooperation, the stopping of the device leads to stopping the fax transmission. In such a case, the use of a hardware stop key is sufficient. However, in a job that uses hardware resources including the scanner and printer, separate jobs may be performed in parallel. In such a case, the use of only a single stop key makes it difficult to identify which job is stopped by the operation of the stop key.

In accordance with the exemplary embodiment, the controller 22 monitoring the progress status of the job causes the operation unit 26 to automatically display desired information to improve the user's operability of the system.

The stopping process of the job in progress in accordance with the exemplary embodiment is described with reference to the fax job.

Figure 2A:
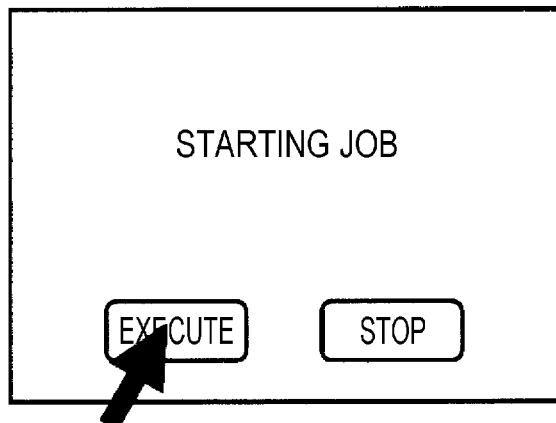
FIG. 2A through FIG. 2C illustrate a job stopping process of an exemplary embodiment.
Figure 2B:
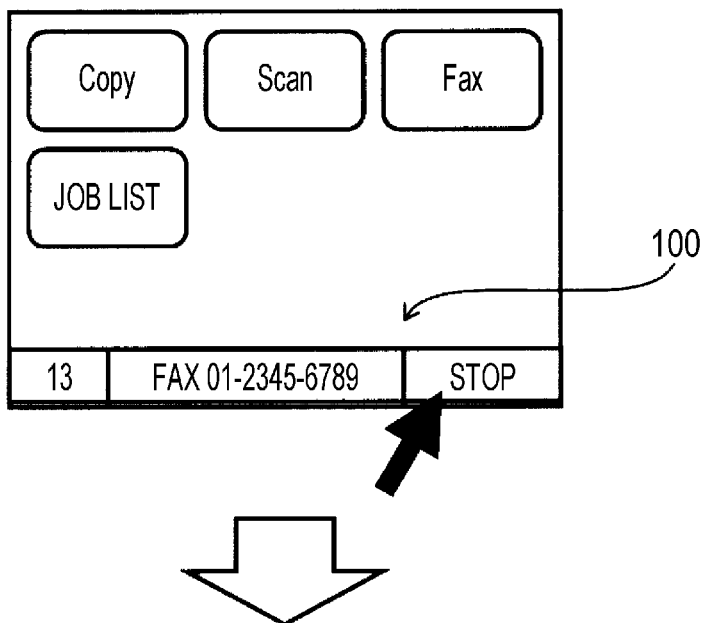
Figure 2C:
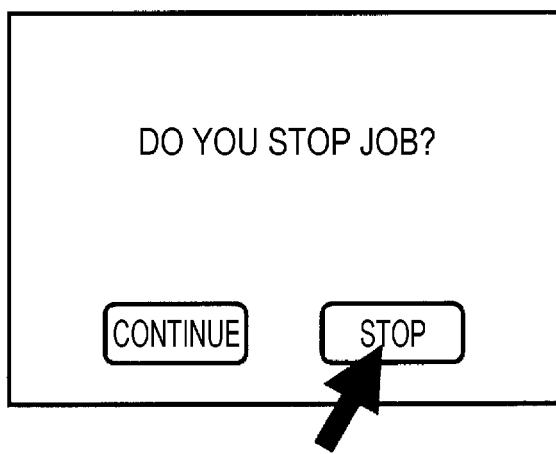

FIG. 2A through FIG. 2C illustrate the stopping process of the fax job in progress in accordance with the exemplary embodiment. More specifically, FIG. 2A through FIG. 2C illustrate how the screen displayed on the operation unit 26 as a touchpanel transitions. It is now assumed that an original document to be fax-transmitted has been placed on a paper sheet tray, and that the fax job has been selected by touching a fax button on the screen (home screen) displayed on the operation unit 26.

FIG. 2A illustrates the screen that appears when the fax job is going to start. The controller 22 displays on the operation unit 26 a message reading "Starting job" together with "execute" and "stop" buttons. The user instructs the fax job to be started by touching the "execute" button. In response to the operation instruction, the controller 22 drives the fax module. The fax module scans the original document placed on the paper sheet tray, thereby converting the data on the original document into image data, and storing the image data on a memory.

FIG. 2B illustrates the screen of the operation unit 26 related to the job in progress. The controller 22 displays a job list button together with a copy application button, a scan application button, and a fax application button. The controller 22 also displays at the bottom of the screen a job in a standby state on a popup screen 100. More specifically, a job that has undergone scanning and is ready for transmission is extracted, and the job number and job name of that job are displayed together with the "stop" button. Displayed at the bottom of the screen of the operation unit 26 is "13 FAX 01-2345-6789". "13" indicates the job number, and "FAX 01-2345-6789" indicates the job name. In the case of the fax transmission job, the job number may be the name of a transmission destination or a telephone number.

If there are multiple transmission jobs ready for execution, the controller 22 extracts and pops up a screen for those jobs. For example, if three transmission jobs ready for execution are present, they are listed as follows:

"13 FAX 01-2345-6789"

"14 FAX 02-4523-8967"

"15 FAX 03-4627-8750"

The controller 22 does not pop up a screen for a job if the job has been completed. If a fax job having a job sequence 12 is present with the transmission thereof completed, that job is not popped up.

The controller 22 automatically displays the screen of FIG. 2B without an operation instruction from the user. The operation instruction from the user agrees, for example, with the listing order of the display job list that is presented in response to the operation of the job list button. The operation instruction from the user is not limited to the listing order of the display job list. More specifically, when a first job begins to be executed with a second job ready for execution in a batch process, the second job is automatically extracted and popped up.

If the user touches the "job list" as illustrated in FIG. 2B, the controller 22 displays the received job list on the operation unit 26. The job list includes a job normally ended in addition to the job in progress (see FIG. 6C).

FIG. 2C illustrates a screen that appears when the user touches the "stop" button on the popup screen 100 on the screen of FIG. 2B. In response to the operation instruction, the controller 22 displays a message reading "Do you stop job?" together with "continue" and "stop" buttons. That screen corresponds to the confirm screen of FIG. 6E. When the user touches the "stop" button on the confirm screen, the controller 22 stops the fax transmission job in response to the operation instruction. The information of the fax transmission job stopped may be left on the memory or may be deleted from the memory. If the three transmission jobs ready for execution are present, and the user stops the job "13 FAX 01-2345-6789", the controller 22 deletes that job and executes the jobs identified by the job numbers 14 and 15.

In the transition of the screen of FIG. 2A through FIG. 2C, the user stops the fax job in progress by merely performing two touching operations subsequent to the start of the fax job.

Figure 3:
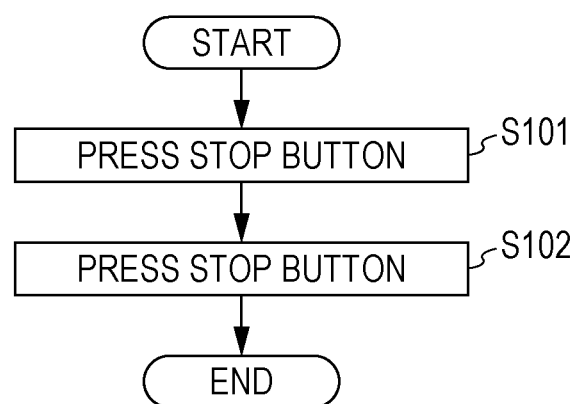
FIG. 3 is a flowchart of the job stopping process of FIG. 2A through FIG. 2C.

FIG. 3 is a flowchart of the job stopping process of the exemplary embodiment.

When the job is executed, the operation unit 26 displays a fax job in progress, namely, a fax transmission job ready for execution on the popup screen 100. Together with the fax transmission job, the operation unit 26 displays the "stop" button to the job. To stop the fax job in progress, the user recognizes the fax transmission job displayed on the popup screen 100 and touches (presses) the "stop" button (S101).

The operation unit 26 displays the confirm screen, and the user touches (presses) the "stop" button to finalize the stopping of the fax transmission job in progress (S102).

The process of related art as described above with reference to FIG. 6A through FIG. 6E includes four steps as listed below.

First step: Press the job confirm button.
Second step: Select the job to be stopped on the job list screen.
Third step: Press the stop button on the detailed screen.
Fourth step: Press the stop button on the confirm screen.
The process of the exemplary embodiment reduces the number of steps to only two steps as below.
First step: Touch the popped-up "stop" button.
Second step: Touch the "stop" button on the confirm screen.

Figure 6A:
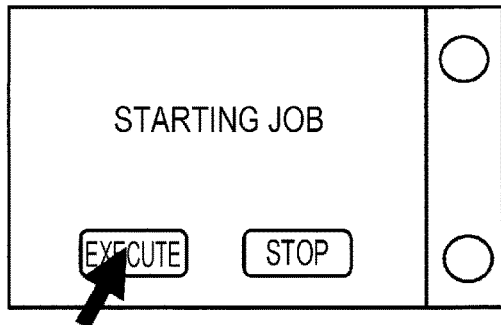
FIG. 6A through FIG. 6E illustrate a job stopping process of related art.
Figure 6B:
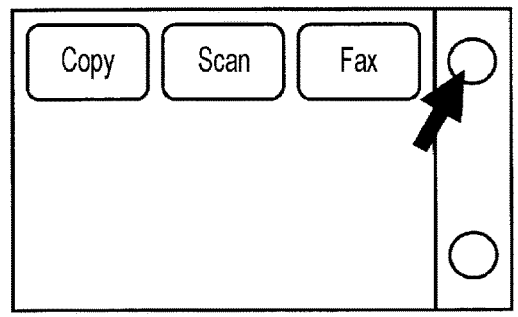
Figure 6C:
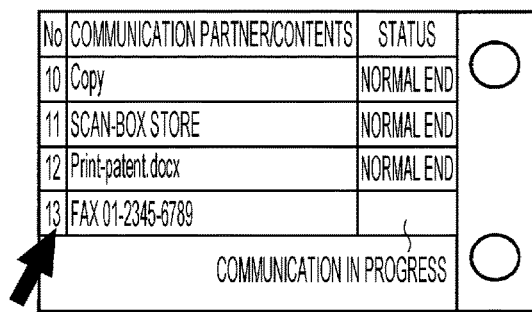
Figure 6D:
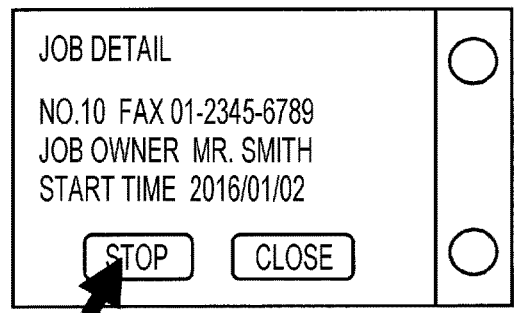
Figure 6E:
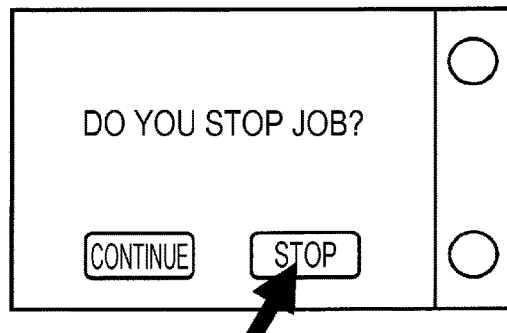

By comparison of the screen transition illustrated in FIG. 2A through FIG. 2C with the screen transition illustrated in FIG. 6A through FIG. 6E, the screen of FIG. 2B of the exemplary embodiment has the functions of FIG. 6B through FIG. 6D. In other words, if there is a job in progress, the controller 22 automatically pops up information that identifies the job in progress without the operation instruction from the user, and the button to stop the job.

In accordance with the exemplary embodiment, the user may stop the job in progress by simply touching the button displayed on the operation unit 26. The system is thus free from separate hardware keys, such as the stop button and the job list button.

FIG. 4A through FIG. 4D illustrate a job stopping process of another exemplary embodiment to stop the fax job in progress. FIG. 4A through FIG. 4D illustrate how the screen displayed on the operation unit 26 transitions.

Figure 4A:
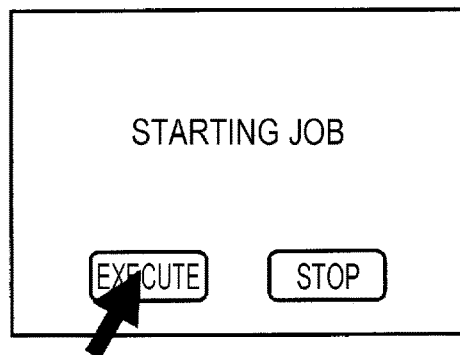
FIG. 4A through FIG. 4D illustrate a job stopping process of another exemplary embodiment.

FIG. 4A illustrates the screen to start a fax job. The controller 22 displays on the operation unit 26 a message reading "Starting job" together with "execute" and "stop" buttons. The user starts the fax job by touching the "execute" button. In response to the operation instruction, the controller 22 drives the fax module. The fax module scans an original document for fax transmission to be converted into image data, and then stores the image data onto the memory.

Figure 4B:
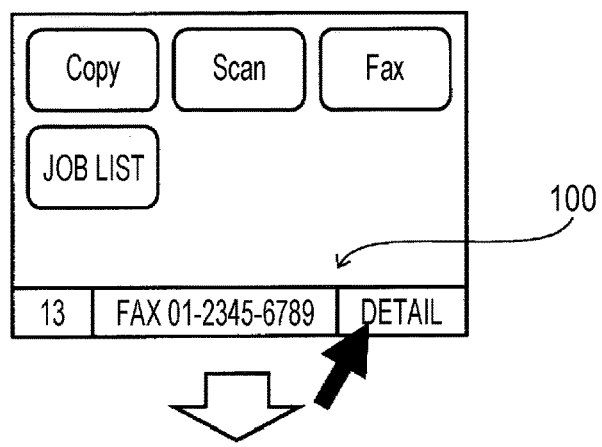

FIG. 4B illustrates the screen of the operation unit 26 related to the job in progress. The controller 22 displays a job list button together with buttons for a copy application, a scan application, and a fax application. A fax transmission job ready for execution is displayed on the popup screen 100 at the bottom of the screen. More specifically, the job that has undergone a scan operation and is ready for transmission is displayed together with the job number thereof, the job name thereof, and a "detail" button.

Figure 4C:
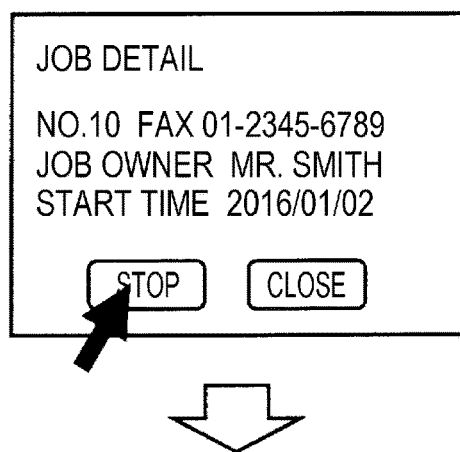

FIG. 4C illustrates a screen that appears when the user selects the "detail" button by touching it on the screen of FIG. 3B. The controller 22 displays the job ready for execution in detail in response to the operation instruction. Referring to FIG. 4C, the controller 22 displays on the screen the job number, job name, job owner, and start time as well as the "stop" and "close" buttons.

Figure 4D:
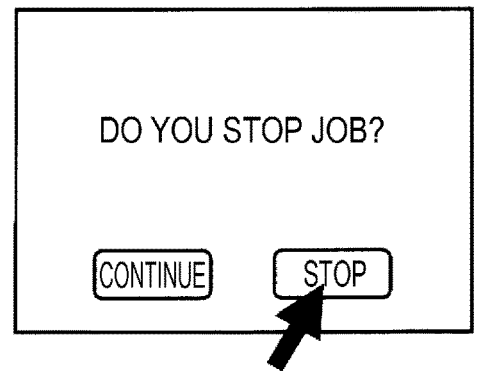

FIG. 4D illustrates a screen that appears when the user touches the "stop" button on the screen of FIG. 4C. In response to the operation instruction, the controller 22 displays a message reading "Do you stop job?", together with "continue" and "stop" buttons. The screen corresponds to the confirm screen of FIG. 6E. If the user touches the "stop" button on the confirm screen, the controller 22 stops the fax transmission ready for execution in response to the operation instruction.

Figure 5:
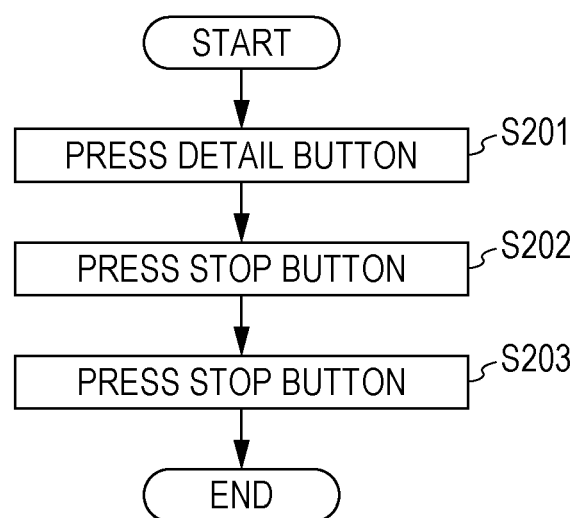
FIG. 5 is a flowchart illustrating the job stopping process of FIG. 4A through FIG. 4D.

FIG. 5 is a process flowchart of the exemplary embodiment.

When a fax job starts to be executed, the fax job in progress is displayed on the popup screen 100 on the operation unit 26. The "detail" button of the fax job is also displayed. To stop the fax job in progress, the user recognizes the fax job displayed on the popup screen 100 and touches the "detail" button (S201).

The detailed screen is displayed on the operation unit 26. The user recognizes the detail of the fax job, and selects stopping by touching the "stop" button (S202).

The confirm screen is displayed next on the operation unit 26. The user touches the stop button, and finalizes the stopping process of the fax job in progress (S203).

In accordance with the exemplary embodiment, the fax job in progress is stopped simply by three steps subsequent to the start of the fax job.

By the comparison of the screen transition of FIG. 4A through FIG. 4D with the screen transition of FIG. 6A through FIG. 6E, the screen of FIG. 4B has the functions of FIG. 6B through FIG. 6C. In other words, if there is a job in progress, without the operation instruction from the user the controller 22 automatically pops up the information identifying the job in progress and the button to stop the job on the screen information. If the user touches the "detail" button of FIG. 4B, detailed information as well as the "stop" button is selectable. The "detail" button thus practically serves as a button to stop the job.

The stopping process of the fax transmission has been described. The stopping process of fax reception may be performed in a similar fashion. If received fax data ready for a print job is present, the controller 22 automatically pops up a screen for the received fax data. If the user touches the popped-up "stop" button, the controller 22 displays the confirm screen and finally stops the print job.

The exemplary embodiments of the present invention have been discussed. The present invention is not limited to these exemplary embodiments. Various modifications are possible to the exemplary embodiments. The modifications are described below.

First Modification

In accordance with the exemplary embodiments, the controller 22 displays on the operation unit 26 a job name as information identifying a fax job in progress on the popup screen 100 together with a "stop" button as illustrated in FIG. 2B. The popup screen 100 displays a job whose execution is stoppable, but does not display a job whose execution is not stoppable. At the timing when the popup screen 100 is presented, the job may be stoppable, but the job may be no longer stoppable later as the batch process of the job is in progress. In such a case, the "stop" button that has been displayed may be set to be hidden, or the popup screen 100 itself may be set to be hidden.

In the case of the fax job, for example, the transmission operation is performed subsequent to the completion of the scan operation. The fax job may be stoppable during a period from the completion of the scan operation to the beginning of the transmission operation. The popup screen 100 is presented as illustrated in FIG. 2B, time elapses without the user's touching the "stop" button, and the scanned data is considered as being actually transmitted (when communication is disconnected after image transmission). The controller 22 then shifts the "stop" button from a display state to a hidden state, or shifts the whole popup screen 100 from a display state to a hidden state. Note that if an access to the stop button is not authorized, pressing the stop button is meaningless, and thus it may be advisable to hide the stop button.

The same is true of the case of FIG. 4B. Even if the fax job is stoppable at the timing when the popup screen 100 is presented, but may be no longer stoppable at the phase of the batch process of the job. In such a case, the "detail" button may be shifted from a display state to a hidden state, or the whole popup screen 100 may be shifted from a display state to a hidden state. Alternatively, the detail button in FIG. 4B may be displayed while the "stop" button may be hidden on the detailed screen of FIG. 4C.

The "hidden state" means that a button on the operation unit 26 remains unselected when the user touches the button. The hidden state includes a state that the button itself is displayed (dimmed) but unselected in response to the touching by the user.

Second Modification

In accordance with the exemplary embodiments, the controller 22 displays the confirm screen on the operation unit 26 as illustrated in FIG. 2C or FIG. 4D, and the user touches the "stop" button on the confirm screen to finalize the stopping of the job. The confirm screen may be deleted. In such a case, the fax job may be stopped by only a single step with reference to FIG. 2A through FIG. 2B, or by only two steps with reference to FIG. 4A through FIG. 4C.

Third Modification

In accordance with the exemplary embodiments, the stopping process has been described with the fax job in progress. The stopping process is similarly applicable to a mail transmission job and a file transmission job. In a job that is batch-processed, during a period extending from the completion of one operation phase to a next operation phase, the job may be automatically popped up on the operation unit 26 such that an operation instruction to stop the job may be ready to be received.

Fourth Modification

In accordance with the exemplary embodiments, the job in progress is popped up at the bottom of the screen as illustrated in FIG. 2B. The popup position is not limited to the bottom of the screen. The popup position is anywhere on the screen. For example, the popup position may be close to the fax button. The "stop" button to be popped up does not necessarily have to be displayed close to information that identifies the job in progress, and may be displayed anywhere on the screen. However, if multiple jobs are displayed, "stop" buttons are respectively displayed in association with the jobs.

Fifth Modification

In accordance with the exemplary embodiments, the "stop" button is displayed together with the job in progress as illustrated in FIG. 2B. The "stop" button may be blinked or highlighted. In the case of the fax job, expected time of period until the beginning of the fax transmission operation may be counted and additionally displayed. Alternatively, the display form of the "stop" button may be dynamically changed in response to the expected time of period.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:
   a touchpanel; and
   a controller configured to display application buttons on the touchpanel and to pop up, on the touchpanel automatically without an operation instruction from a user, a list of jobs ready for execution while the touchpanel displays the application buttons, each job displayed including extracted information that identifies a job ready for execution, the list of jobs including a plurality of buttons, each button of the plurality of buttons being paired with a job in the list of jobs and is adapted to stop the execution of the corresponding job associated therewith, wherein
   each job is automatically popped up on the list of jobs, upon receipt of a job instruction without a further operation from the user.

2. The image forming apparatus according to claim 1, wherein the button comprises a stop button.

3. The image forming apparatus according to claim 1, wherein the button comprises a detail button that is adapted to display a detailed screen of the job ready for execution, and wherein the detailed screen is configured to display a stop button.

4. The image forming apparatus according to claim 1, wherein the button that has been displayed is hidden if the execution of the job has been completed.

5. The image forming apparatus according to claim 2, wherein the button that has been displayed is hidden if the execution of the job has been completed.

6. The image forming apparatus according to claim 3, wherein the button that has been displayed is hidden if the execution of the job has been completed.

7. The image forming apparatus according to claim 1, wherein the information comprises a plurality of jobs ready for execution.

8. The image forming apparatus according to claim 1, wherein the application buttons include a copy application button, a scan application button and a facsimile application button.

9. The image forming apparatus according to claim 1, wherein
each of the jobs included in the list of jobs displayed while the touchpanel displays the application buttons has not yet started execution, and
each button of the plurality of buttons is paired with only one job in the list of jobs.

10. The image forming apparatus according to claim 1, wherein each of the jobs included in the list of jobs ready for execution is stoppable.

11. The image forming apparatus according to claim 1, wherein a first job in the list of jobs is populated in the list of jobs in response to operation of a fax job button on the touchpanel.

12. An image forming method comprising:
receiving a request to start executing a job;
popping up, on a touchpanel automatically without an operation instruction from a user, a list of jobs ready for execution, each job displayed including extracted information that identifies the job ready for execution while the touchpanel displays application buttons, the list of jobs including a plurality of buttons, each button of the plurality of buttons being paired with a job in the list of jobs and is adapted to stop the execution of the corresponding job associated therewith; and
stopping the job ready for execution in response to a user's operation of the button, wherein
each job is automatically popped up on the list of jobs, upon receipt of a job instruction without a further operation from the user.

13. The method according to claim 12, wherein the application buttons include a copy application button, a scan application button and a facsimile application button.

14. The image forming method according to claim 12, wherein
each of the jobs included in the list of jobs displayed while the touchpanel displays the application buttons, has not yet started execution, and
each button of the plurality of buttons is paired with only one job in the list of jobs.

15. The image forming method according to claim 12, wherein each of the jobs included in the list of jobs ready for execution is stoppable.

16. The image forming method according to claim 12, wherein a first job in the list of jobs is populated in the list of jobs in response to operation of a fax job button on the touchpanel.

17. A non-transitory computer readable medium storing a program causing a computer to execute a process for forming an image, the process comprising:
receiving a request to start executing a first job;
popping up, on a touchpanel automatically without an operation instruction from a user, extracted information that identifies the first job ready for execution together with a first button that is adapted to stop the execution of the first job while the touchpanel displays application buttons; and
stopping the first job ready for execution in response to a user's operation of the first button, wherein
when the first job begins to be executed with a second job ready for execution in a batch process, the second job is automatically extracted and popped up on the touchpanel with a second button that is adapted to stop the execution of the second job while the touchpanel displays the application buttons.

18. The non-transitory computer readable medium according to claim 17, wherein the application buttons include a copy application button, a scan application button and a facsimile application button.

19. The non-transitory computer readable medium according to claim 17, wherein
execution of the first job has not yet started at a time the first button is popped up,
the first button is adapted to stop the execution of only the first job,
execution of the second job has not yet started at a time the second button is popped up, and
the second button is adapted to stop the execution of only the second job.

20. The non-transitory computer readable medium according to claim 17, wherein
the first job is stoppable at a time the extracted information that identifies the first job and the first button are popped up, and
the second job is stoppable at a time the second button is popped up.

21. The non-transitory computer readable medium according to claim 17, wherein the first job is populated in a list of jobs in response to operation of a fax job button on the touchpanel.

* * * * *